(12) United States Patent
Udall

(10) Patent No.: US 6,804,856 B2
(45) Date of Patent: Oct. 19, 2004

(54) CLEANING OF SURFACES

(75) Inventor: Alan Leslie Udall, Wheaton Aston (GB)

(73) Assignee: Duplex Cleaning Machines (UK) Limited (GB)

( * ) Notice: Subject to any disclaimer, the term of this patent is extended or adjusted under 35 U.S.C. 154(b) by 0 days.

(21) Appl. No.: 10/239,008

(22) PCT Filed: Mar. 16, 2001

(86) PCT No.: PCT/GB01/01175

§ 371 (c)(1),
(2), (4) Date: Sep. 17, 2002

(87) PCT Pub. No.: WO01/68276

PCT Pub. Date: Sep. 20, 2001

(65) Prior Publication Data

US 2003/0041880 A1 Mar. 6, 2003

(30) Foreign Application Priority Data

Mar. 17, 2000 (GB) .............................. 0006349

(51) Int. Cl.⁷ .......................... A47L 9/04; A47L 11/202; A47L 11/34
(52) U.S. Cl. .......................................... 15/302; 15/320
(58) Field of Search .......................... 15/320, 322, 344, 15/302; 139/6, 9, 30

(56) References Cited

U.S. PATENT DOCUMENTS

| | | | | | |
|---|---|---|---|---|---|
| 3,204,271 A | * | 9/1965 | Kington | ...................... | 15/1.51 |
| 3,402,420 A | * | 9/1968 | Schaeffer | ...................... | 15/320 |
| 4,139,922 A | * | 2/1979 | Fitch | ............................ | 15/321 |
| 4,433,451 A | * | 2/1984 | Parisi | ........................... | 15/321 |
| 4,951,346 A | * | 8/1990 | Salmon | ........................ | 15/322 |
| 5,502,872 A | * | 4/1996 | Chae et al. | ................... | 15/320 |
| 6,446,302 B1 | * | 9/2002 | Kasper et al. | ................ | 15/319 |

FOREIGN PATENT DOCUMENTS

| | | |
|---|---|---|
| EP | 0 717 952 A1 | 6/1996 |
| GB | 905 423 | 9/1962 |
| GB | 2 155 825 | 10/1985 |
| WO | WO 98/48686 | 11/1998 |

\* cited by examiner

*Primary Examiner*—Randy Gulakowski
*Assistant Examiner*—Saeed Chaudhry

(57) ABSTRACT

Apparatus for cleaning a surface, comprising brush means including a body (16) which carries bristles (17) engageable with the surface; means for effecting movement of the bristles relative to the surface, to provide an agitating cleaning action thereon; said bristle-carrying body further being provided with steam delivery means (20, 21) for applying steam to said surface in a region thereof engaged by said bristles. The apparatus may be for cleaning a conveyor belt (10), with the brush in the form of a drum (16) rotatable about an axis (18) parallel to the conveyor belt with the steam passing through the drum and emerging through peripheral apertures (21), the brush being disposed within a hood (15) with an extraction system for loosened dirt and water.

16 Claims, 2 Drawing Sheets

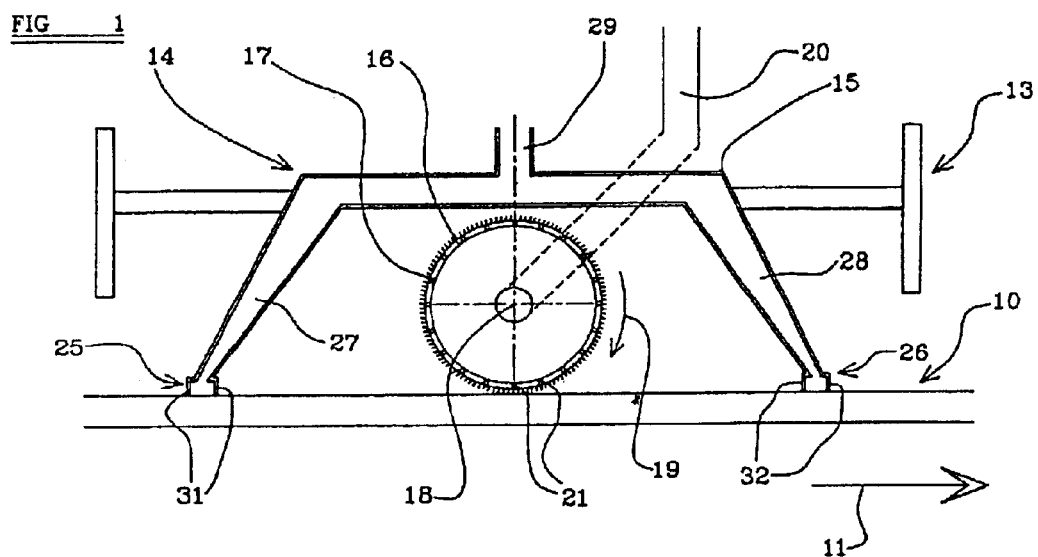
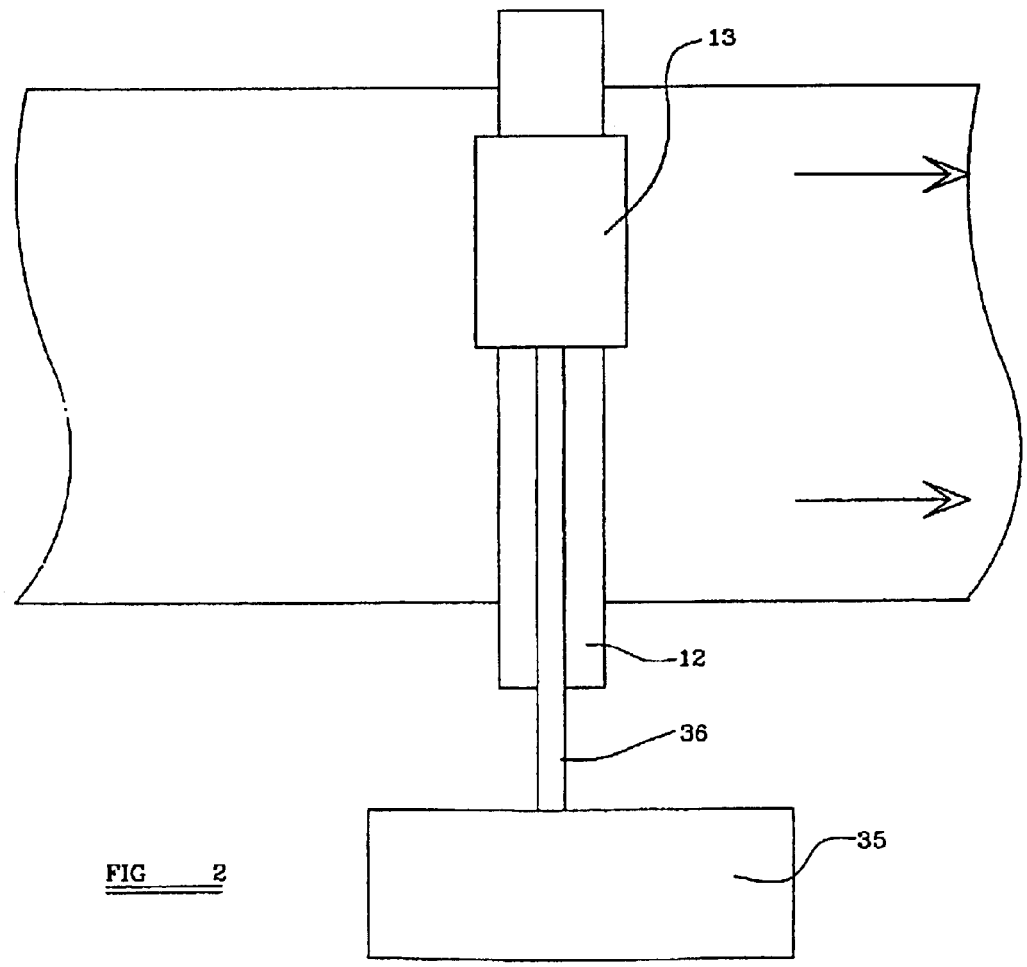

CLEANING OF SURFACES

BACKGROUND OF THE INVENTION

This invention relates to the cleaning of surfaces. The invention has been devised in relation to the cleaning of a floor surface, or the surface of a conveyor belt, but it is believed the invention will also find utilization in the cleaning of other surfaces, e.g. wall surfaces.

One application of the invention is for the cleaning of conveyors for use in the food industry, where cleanliness and hygiene are of high importance. One technique which has been used for these reasons is that of steam cleaning in which steam is applied to the belt surface through one or more jets or nozzles. This combined with the agitating or abrading action of brush bristles on the belt leads to the achieving of a high standard of cleanliness. However, the application of steam to the belt surface has been carried out in a region separated from the region in which brush bristles act on the belt surface.

SUMMARY OF THE INVENTION

It is broadly the object of the present invention to provide an improved method and apparatus for cleaning a surface for example a floor surface or that of a conveyor belt. The particular features of the invention whereby such an improvement is achieved will be referred to hereafter.

According to one aspect of the present invention, we provide apparatus for cleaning a surface, comprising brush means including a body which carries bristles engageable with the surface; means for effecting movement of the bristles relative to the surface, to provide an agitating cleaning action thereon; said bristle-carrying body further being provided with steam delivery means for applying steam to said surface in a region thereof engaged by said bristles.

Conveniently said bristle-carrying body is a hollow body and said steam delivery means provides for steam to be passed therethrough and to emerge in the vicinity of said bristles.

Preferably said bristle-carrying body is in the form of a hollow cylinder with bristles carried on the external surface of a peripheral wall thereof, supported for rotation and drivable about its longitudinal axis so that the bristles are operable on a surface lying substantially parallel to said axis. Preferably steam is supplied to the interior of such a body and emerges through passages afforded by apertures in the peripheral wall of the body.

By such expedients, the invention ensures that steam is applied to the conveyor surface in the region in which it is engaged by the bristles rather than at a spacing from such region. Improved effectiveness in cleaning is thereby achieved, while less steam is required than if it were applied to the surface at a distance from the brush means.

Preferably said brush means is disposed within and covered by a hood which is arranged to approach the surface which is to be cleaned. Thereby steam emerging from the bristle-carrying body of the brush means at parts of the periphery thereof not facing the surface is constrained and prevented from escape into the surrounding atmosphere, and can contact the surface being cleaned within the entire area of such a hood as well as in the comparatively small part of such area where the bristles engage the surface, further to enhance the cleaning operation.

Preferably there is extraction means for removing loosened dirt, water due to condensation of the steam, etc. from the surface being cleaned. Preferably such extraction means has at least one intake at one or more boundary(s) of the hood; thereby it will prevent excess steam from escaping at such boundary(s).

Preferably the axis of the brush means extends transversely of a conveyor in relation to which the apparatus according to the invention is installed, and further preferably, in such an installation, the extraction means has intake openings at the front and rear of the hood with respect to the normal direction of movement of the conveyor belt.

One or more further cleaning devices or expedients may be provided in association with the apparatus according to the invention as above described, for example wiping members, brushes, air jets and so on may be provided in the region of the aforesaid intake opening or openings of the extraction system.

Apparatus in accordance with the invention may be mounted on a support means, e.g. a chassis structure enabling the apparatus to be moved over a surface which is required to be cleaned (for example a floor surface) while being supported at the appropriate height above such surface for the apparatus to function satisfactorily. Alternatively the apparatus can be supported by a fixed frame in the case such as a conveyor belt where the surface which is to be cleaned moves past the place where the apparatus is mounted.

Whilst it would be possible for apparatus in accordance with the invention to extend across the whole width of the belt, the apparatus may be supported by means providing for it to move transversely of the belt in order to enable an apparatus of lesser width to be able to cover the entire width of the conveyor belt by being moved transversely thereof. In use the cleaning apparatus may be moved transversely of the conveyor belt while the conveyor belt is moving, the movement of the apparatus being coordinated, manually or automatically, with the movement of the belt in order to cover substantially the entire surface thereof in use.

It would be possible for a steam generator and a suction generator for the extraction system to be mounted with the brush means, hood, and other associated components as referred to above, on a chassis to form a single unit movable over a floor surface for example. As applied to conveyor belt cleaning, steam may be delivered to the apparatus from a remotely-positioned steam generator, e.g. disposed alongside the conveyor. Similarly the extraction system may be connected to a source of suction at a remote location; both a steam generator and source of suction could be disposed in an equipment cabinet also containing an appropriate control system for controlling operation of the apparatus. Connection may be made by suitable, preferably flexible, pipes and electrical cables.

BRIEF DESCRIPTION OF THE DRAWINGS

The invention will now be described by way of example with reference to the accompanying drawings, of which:

FIG. 1 is a diagrammatic sectional view of an apparatus in accordance with the invention;

FIG. 2 is a plan view of the apparatus, mounted in relation to a conveyor belt for cleaning the latter;

DETAILED DESCRIPTION OF THE INVENTION

Figure 3:
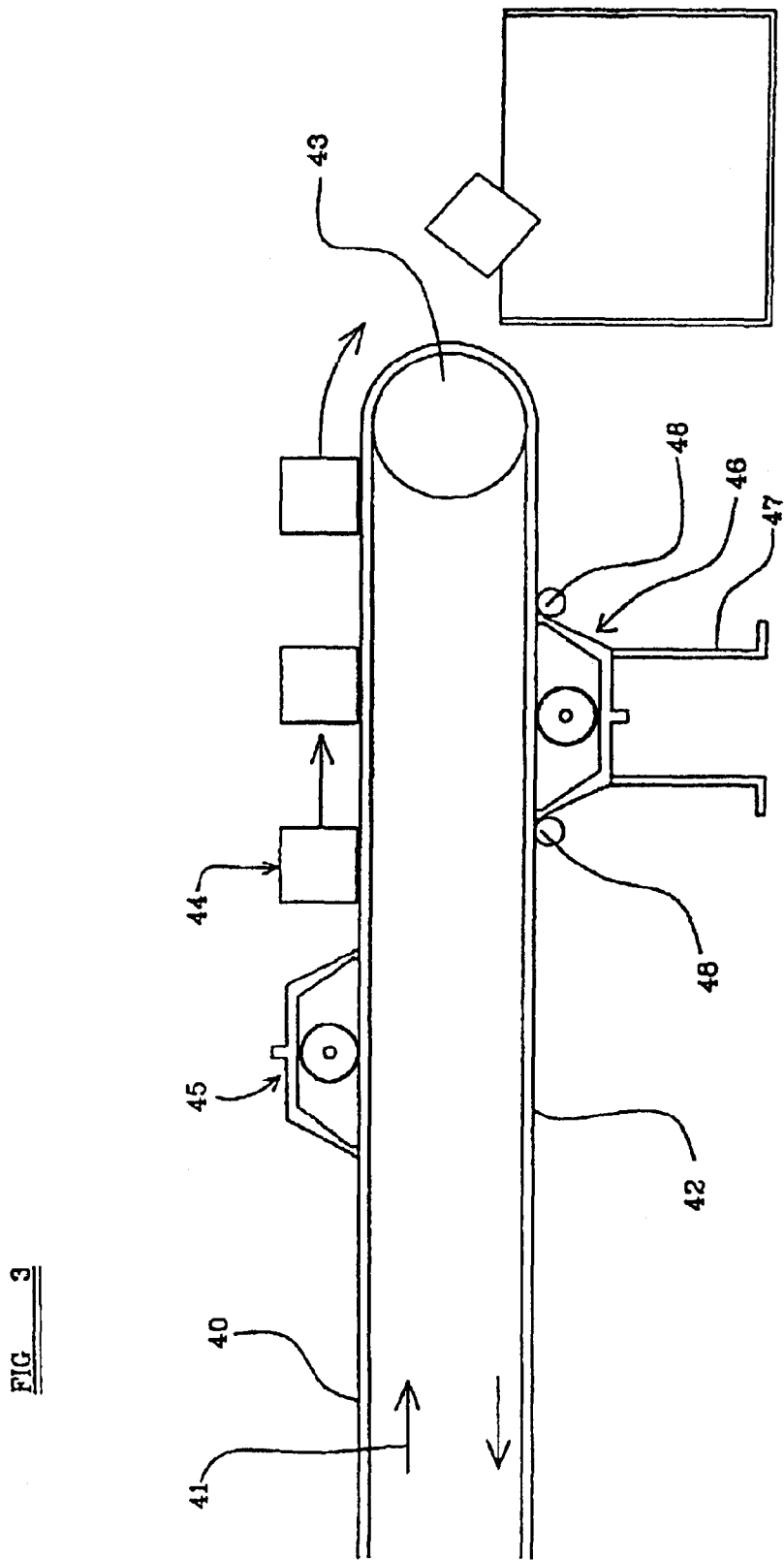
FIG. 3 shows diagrammatically where apparatus in accordance with the invention might be mounted in relation to a conveyor belt.

Referring to FIGS. 1 and 2 of the drawings, a conveyor belt is indicated at 10 and its normal direction of movement is indicated by arrow 11. Disposed above the conveyor belt 10 and extending transversely thereof is a support frame indicated diagrammatically at 12, and this supports a carriage assembly indicated diagrammatically at 13 which carries a cleaning head indicated generally at 14.

The cleaning head 14 comprises a hood assembly 15 which is open at its bottom and faces the upwardly presented surface of the conveyor belt 10. Within the hood 15 there is mounted a brush which comprises a body 16 in the form of a hollow cylinder or drum with bristles 17 carried on the external surface of its peripheral wall. The brush is rotatable about its central longitudinal axis 18 which extends parallel to the surface of the conveyor belt 10. The brush is rotatable about the axis 18 as indicated by arrow 19, and the cleaning head assembly carries a suitable motor, e.g. an electric motor connected to the brush by a suitable transmission mechanism for effecting such rotation.

The brush body 16 is hollow and steam is delivered to its interior by an inlet pipe indicated diagrammatically at 20. There are a number of apertures as indicated diagrammatically at 21 in the body 16 for release of steam in the vicinity of the bristles 17. There may be any number of apertures of any required form spaced circumferentially and lengthwise of the body of the brush to ensure satisfactory delivery of steam to the region in which the bristles of the brush contact the conveyor belt 10 as the brush rotates, and across the width of the conveyor belt which is engaged by the brush.

At the front edge and rear edge of the hood 15, having regard to the normal direction of movement 11 of the conveyor belt, there are respective intake openings 25, 26 leading to respective passages 27, 28 in the hood and thence to a connection 29 to a source of suction of an extraction system. Associated with the intakes 25, 26, which extend parallel to the axis 18 for substantially the whole extent of the hood in that direction, there are shown squeegee or wiper blades or assemblies 31, 32; other cleaning devices may be provided at such positions, e.g. further brushes for contacting the conveyor belt surface, an air jet or jets for assisting drying the surface at the intake 26, and so on.

Shown in FIG. 2 there is an equipment cabinet 35 alongside the conveyor belt 10, which contains a steam generator and an extraction system for connection 36, by flexible pipes or hoses, to the steam inlet 20 and extraction connection 29 on the cleaning head assembly 14. The equipment cabinet may also contain control equipment for controlling operation of the apparatus. In particular the deliver of steam, operation of the suction extraction system, and rotation of the brush 16 may be individually controlled so that the brush may, for example, be used "dry" when required.

As illustrated the cleaning head 14 is of substantially less width than the conveyor belt 10 and therefore to clear the entire surface of the latter movement of the head in the direction transversely of the conveyor belt is required. With the conveyor belt moving, the head may be left in one position for sufficient time to clean a part of the width and the whole of the length of the conveyor belt after which the head is moved transversely of the conveyor belt to clean another part of the width thereof. This is repeated until the entire surface of the conveyor belt is cleaned. Movement of the cleaning head in the direction transversely of the conveyor belt may be effected manually, or automatically by a suitable control system. Alternatively the cleaning head could be repeatedly reciprocated transversely of the conveyor belt to clean the surface thereof in a zigzag path thereon, such operation proceeding until the entire surface of the belt has been satisfactorily cleaned.

Whichever method of operation is adopted, the invention enables the surfaces of a conveyor belt to be effectively and economically cleaned when such cleaning is required.

FIG. 3 shows diagrammatically possible positions in which apparatus in accordance with the invention may be mounted in relation to a conveyor belt in order to clean the latter. In this Figure, the upper, load-carrying, run of a conveyor belt is indicated at 40 and its direction of travel by arrow 41. The lower, return, run of the belt is indicated at 42, the belt having passed around a guide roller 43 at its end. Items are delivered onto the conveyor at a loading station indicated by arrow 44, and transported by the conveyor to its end where they are unloaded or delivered. Cleaning apparatus according to the invention may be mounted as indicated at 45, in order to clean the surface of the conveyor belt before items are placed on it at the loading station 44.

Alternatively, the cleaning apparatus may be disposed beneath the conveyor to clean the surface of the belt while it is moving along its return path 42. By way of example such a position of the cleaning apparatus is indicated at 46, supported by a stand 47 or, alternatively, suspended from the framework of the conveyor. In this case it may be necessary to provide additional guide rollers for the conveyor belt as indicated at 48. Cleaning the surface of the conveyor belt while it is on its return run provides maximum time for it to dry before it is loaded with items which are to be transported. An extraction system provided as part of the cleaning apparatus will, of course, have to be arranged to remove any debris or the like falling from the surface of the conveyor belt within the upwardly-facing hood of the apparatus.

Although described above in relation to the cleaning of a conveyor belt, the apparatus in accordance with the invention may be used for cleaning other surfaces for example a floor surface. For this purpose, the cleaning head may be mounted on a suitable frame or chassis structure movable over such a surface on wheels for example. A steam generator and suction generator may be mounted with the cleaning head on such a chassis. As referred to above, in relation to the cleaning of a conveyor belt surface, the apparatus is usable for cleaning surfaces other than those which are upwardly presented and with any appropriate modifications may be used for cleaning, for example, a wall surface.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. An apparatus for cleaning a surface comprising:
    a brush having a hollow body with bristles carried on an external surface of a peripheral wall thereof, said brush being disposed within and covered by a hood which is arranged to approach the surface which is to be cleaned;
    a motor for effecting movement of the bristles relative to the surface, to provide an agitating cleaning action thereon; and
    a conduit in fluid communication with an interior of said hollow body to provide steam to said interior;
    wherein said hollow body includes a plurality of apertures formed in said peripheral wall for applying steam to said surface in a region thereof engaged by said bristles.

2. An apparatus according to claim 1 further comprising an extraction mechanism for removing matter from the surface being cleaned.

3. An apparatus according to claim 2 wherein said extraction mechanism has at least one intake at one or more boundaries of the hood.

4. An apparatus according to claim 3 comprising at least one further cleaning device associated with said at least one intake.

5. An apparatus according to claim 1 wherein said hood comprises at least one intake at one or more boundaries of the hood.

6. An apparatus according to claim 5 comprising at least one cleaning device at said at least one intake.

7. An apparatus according to claim 1 further comprising a frame for supporting the apparatus in relation to a conveyor belt.

8. An apparatus for cleaning a surface, comprising:
   a brush having a hollow body with an external peripheral wall and a plurality of bristles extending outwardly from said peripheral wall, said peripheral wall including a plurality of apertures permitting steam to emerge from the interior of the hollow body in the vicinity of said bristles;
   a motor for effecting movement of the brush so that said bristles brush the surface to be cleaned;
   a conduit iii fluid communication with an interior of said hollow body to provide steam to said interior;
   a hood within which said brush is disposed, said hood having boundaries which extend to approach the surface to be cleaned; and
   an extractor for matter from the surface to be cleaned, said extractor having at least one intake at at least one of said boundaries of the hood.

9. An apparatus according to claim 3 further comprising a support for the apparatus to be supported at an appropriate height above a surface to be cleaned and enabling the apparatus to be moved relative to said surface.

10. An apparatus according to claim 9 wherein said support comprises a chassis enabling the apparatus to be moved over a floor surface.

11. An apparatus according to claim 9 wherein said support comprises a frame for supporting the apparatus in relation to a conveyor belt.

12. An apparatus according to claim 11 wherein said frame provides for movement of the apparatus in a direction transversely of the conveyor belt.

13. An apparatus according to claim 12 comprising a remotely-positioned steam generator, and source of suction for said extractor.

14. A conveyor system comprising a conveyor belt and apparatus according to claim 11 arranged for cleaning the conveyor belt.

15. An apparatus according to claim 8 further comprising at least one additional cleaning device at said at least one intake.

16. An apparatus for cleaning a surface, comprising:
   a brush having a hollow body in the form of a cylinder having a longitudinal axis and an external peripheral wall extending about said longitudinal axis, and a plurality of bristles extending outwardly from said peripheral wall, said peripheral wall including a plurality of apertures permitting steam to emerge from the interior of the hollow body in the vicinity of said bristles,
   a motor for effecting rotation of the brush about said longitudinal axis so that said bristles brush a surface to be cleaned extending substantially parallel to said longitudinal axis;
   a conduit in fluid communication with an interior of said hollow body to provide steam to said interior;
   a hood within which said brush is disposed, said hood having boundaries which extend to approach the surface to be cleaned; and
   an extractor for matter from the surface to be cleaned, said extractor having at least one intake at at least one of said boundaries of the hood.

* * * * *